Patented Mar. 17, 1942

2,276,840

UNITED STATES PATENT OFFICE 2,276,840

POLYMERIC VINYLIMIDES

William Edward Hanford and Halsey Bidwell Stevenson, Wilmington, Del., assignors to E. I. du Pont de Nemours & Company, Wilmington, Del., a corporation of Delaware No Drawing. Application July 18, 1939, Serial No. 285,194

12 Claims. (Cl. 260—78)

This invention relates to synthetic resins and, more particularly, to polymers and interpolymers of N-vinylimides.

This invention has as an object the provision of a process for the preparation of polymers and interpolymers of N-vinylphthalimides. A further object is the preparation of new coating and plastic compositions. Another object is the provision of modifying agents for cellulosic materials. Other objects will appear hereinafter.

These objects are accomplished by the following invention wherein an N-vinylimide of an aromatic, including aromatic heterocyclic, dicarboxylic acid having the carboxyls on adjacent ring carbon atoms, is polymerized either alone or in the presence of one or more other polymerizable materials, preferably polymerizable organic compounds containing the methylene ($CH_2$) group attached by an ethylenic double bond to a carbon atom, which is in turn attached, through not more than one chain atom, to at least one negative group, i. e., polymerizable vinyl and vinylidene compounds.

In the process of the present invention, the N-vinylphthalimide which has the general formula

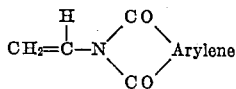

is polymerized in the presence or absence of solvents and preferably in the presence of catalysts, preferably peroxide catalysts. Polymerization at low temperature, i. e., room temperature is practically non-existent in the absence of catalysts and even at 200° C. is slow unless catalysts are used or the reaction mixture is exposed to the oxygen of the air.

The monomeric materials which are to be polymerized by the process of the present invention may be prepared by a variety of methods. Thus, some may be prepared by the pyrolysis of α-methyl phthalimido acid halides, e. g., phthalyl-alpha-alanyl chloride; by the dehydration of suitable beta-hydroxy phthalimido ethanes

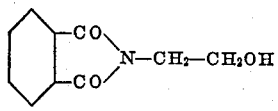

by reaction of phthalimide with acetylene, etc.

A preferred method of preparing the monomeric materials is illustrated in Example A. Temperatures are given in degrees centigrade.

Example A

To a quantity of monoethanolamine is added, in small portions, an equimolar quantity of phthalic anhydride. The mixture is refluxed for two hours and the water removed under vacuum. To the residue is added an excess of acetic anhydride and a trace of sulfuric acid. After refluxing for one hour, the acetic acid and excess acetic anhydride are removed under vacuum and the residue is distilled under reduced pressure. A 90% yield of beta-phthalimidoethyl acetate, boiling at 222–224°/28 mm. is obtained. After recrystallization from dilute alcohol, this compound melts at 88.5–90.5° and yields on analysis 6.14% nitrogen as compared with a theoretical figure of 6.0% nitrogen.

The phthalimidoethyl acetate is pyrolyzed by passing the melted compound slowly through a glass tube heated at 560–575°. The pyrolysate is then distilled through an efficient fractionating column at 129–132°/2.5 mm. and the orange-yellow distillate is recrystallized twice from alcohol to give light-yellow N-vinylphthalimide, melting at 85.5–86.2°.

The more detailed practice of the invention is illustrated by the following examples, wherein parts given are by weight and temperatures are in degrees centigrade. There are of course many forms of the invention other than these specific embodiments.

Example I

Five parts of N-vinylphthalimide, M. P. 84.5–85.5°, maintained at 98° in contact with air for two days yields 3 parts of a soft, resinous polymeric material. N-vinylphthalimide does not polymerize on standing at room temperature for a year and a half.

Example II

Fifty parts of N-vinylphthalimide is melted on a steam bath and .05 part of benzoyl peroxide is added rapidly. Polymerization starts immediately and is completed by allowing the mixture to stand for ten hours in an oven at 98°. The polymer is light yellow, hard, brilliant and transparent, and has a softening point of 117°. It is soluble in phenol and dimethylformamide, but insoluble in the common organic solvents, e. g., ethanol, ether, acetone, ethyl acetate, ligroin and benzene. Its intrinsic viscosity in meta-cresol is 1.08 to 1.34 where intrinsic viscosity is defined as $$\frac{\log_e N_r}{C}$$

in which Nr is the viscosity of a dilute (e. g. 0.5%) meta-cresol solution of the polymer divided by the viscosity of meta-cresol at the temperature of measurement and in the same unit and C is the concentration expressed in grams of polymer per 100 cc. of solution.

Example III

Fifty parts of N-vinylphthalimide in 10 parts of acetic acid is heated with .05 part of benzoyl peroxide at 100°. Polymerization sets in within two minutes and is complete in five. The white polymeric material is washed with water and dried and has an intrinsic viscosity in cresol of .44. Other solvents in which N-vinylphthalimide is polymerized by a similar method are cyclohexanone, ethyl alcohol, formamide and benzene. The polymer has a lower molecular weight than that prepared by the methods of Examples II and IV.

Example IV

To a solution of 0.15 part of methyl starch and 100 parts of water in a reaction vessel fitted with a long air condenser and an efficient stirrer, is added, with stirring, 50 parts of N-vinylphthalimide and, after heating to 90°, 0.5 part of benzoyl peroxide. Polymerization starts in about two minutes and is complete in less than five. The mixture is maintained at 90° and stirring is continued for thirty minutes. The finely granulated material is washed with several portions of water and finally with alcohol. Its intrinsic viscosity in meta-cresol is 1.37. The polymer is molded at 240° to give an amber-colored material with a softening point of 180°.

Example V

A solution of 40 parts of methacrylic acid, 10 parts of N-vinylphthalimide, 150 parts of toluene and 0.5 part of benzoyl peroxide is heated in a closed system at 60° for twenty-four hours. The semi-solid material is agitated with toluene and filtered, to give a 100% yield of white polymer. The interpolymer is readily soluble in alkali, whereas polyvinylphthalimide itself is alkali-insoluble.

Example VI

A mixture of equal parts of methyl acrylate and N-vinylphthalimide is polymerized by the method used in Example IV using twice the volume of water with 0.3% methyl starch as dispersing agent and 1% benzoyl peroxide as catalyst, to give a polymer softening at 68°, whereas methyl acrylate polymerized under the same conditions softens at 35–40° C.

The substitution of an equal quantity of beta-methoxyethyl methacrylate for the methyl acrylate of the above example gives an interpolymer having a softening point of 118°, whereas the polymer of beta-methoxyethyl methacrylate softens at 30°. When a mixture of 80 parts of methyl methacrylate and 20 parts of N-vinylphthalimide is polymerized as in the example above, the interpolymer softens at 136°. It is to be noted that the addition of only twenty per cent of the N-vinylphthalimide to the reaction components raises the softening point of the methyl methacrylate about 25°. Standard methyl methacrylate melts around 105° C.

Example VII

An emulsion, prepared by shaking together 25 parts of methyl acrylate, 25 parts of N-vinylphthalimide, 5 parts of sulfated oleyl acetate, 1 part of 30% hydrogen peroxide, 125 parts of water and 2 parts of urea, is left in a 45° oven for five days. The mixture is steam distilled, the residue in the still precipitated with aluminum sulfate solution, filtered and washed with methanol. A quantitative yield of a polymer softening at 72° is thus obtained.

Example VIII

A mixture of equal parts of methyl vinyl ketone and N-vinylphthalimide is polymerized by the method of Example V. The product is a yellow interpolymer softening at 112° C., whereas polymeric methyl vinyl ketone softens at 35–40° C.

Example IX

An emulsion of 35 parts of methacrylonitrile, 15 parts of N-vinylphthalimide, 5 parts of sulfated oleyl acetate emulsifying agent, 1 part of 30% hydrogen peroxide catalyst and 125 parts of water is maintained at 65° for three days. On steam distillation, the polymer of the product precipitates and is washed with water and methanol. A molding made at 150° has a softening point of 104°.

Example X

An emulsion of 24 parts of unsymmetrical dichloroethylene, 10 parts of N-vinylphthalimide, 5 parts of vinyl acetate, 0.4 part of 30% hydrogen peroxide, 2.4 parts of sulfated oleyl acetate, 60 parts of water and 0.08 part of concentrated hydrochloric acid is maintained at 45° for five days. After precipitating and washing, the interpolymer is molded at 130° to a material softening at 88°.

Example XI

A pressure vessel containing 200 parts of distilled water, 0.6 part of methylated starch, 33.3 parts of vinyl acetate, 16.6 parts of N-vinylphthalimide and 0.75 part of 30° hydrogen peroxide is sealed and shaken at 100° C. for seven hours. The solid product is washed by decantation, filtered and dried at 100°. A finely granulated interpolymer is obtained which molds to a translucent, slightly greenish-yellow chip softening at 85°. Polyvinyl acetate softens at about 35° C.

Example XII

A mixture of 72 parts of chloroprene, 8 parts of N-vinylphthalimide, 0.8 part of benzoyl peroxide and 60 parts of carbon tetrachloride is heated for twenty-four hours at 80° in a closed vessel. After washing with alcohol, there is obtained 64.5 parts of a rubbery interpolymer containing 12% of N-vinylphthalimide and 34.72% chlorine. This interpolymer is more resistant to hydrocarbon solvents such as kerosene than polymerized chloroprene itself.

Example XIII

A mixture of 10 parts of pure styrene, 10 parts of N-vinylphthalimide and 0.1 part of benzoyl peroxide is heated in a closed vessel for three days at 65° to give a hard interpolymer softening above 100° C.

Although in the above examples, certain concentrations, temperatures, etc., have been mentioned, these conditions are by no means critical. N-vinylphthalimide can be polymerized, as shown in the foregoing examples, per se, without addition of solvent or diluent, in solution, in aqueous suspension with stirring with a protective colloid to give a granular polymer, or in emulsion without stirring. As solvents for the solution polymerization may be mentioned aliphatic and aromatic hydrocarbons, alcohols, ketones, esters, and ethers which dissolve the monomeric material and are chemically inert, under the conditions of the process, to monomer and polymer. Any organic peroxide and aqueous hydrogen peroxide may be used as catalyst.

Any protective colloid which yields the polymer in granular form on polymerization, with stirring, in aqueous media, such as soluble starch, methyl starch, an alkali salt of a methacrylic acid/methyl methacrylate interpolymer, partially neutralized polymethacrylic acid, polymethacrylamide, partially saponified polyvinyl acetate, etc., as well as any suitable emulsifying agent such as alkali metal salts of alkyl napthalene sulfonic acid, sodium oleate, triethanolamine stearate, cetyl pyridinium bromide, etc., for polymerization in emulsion may be used in those variations of the process. The temperatures used may vary from 10° with active catalysts to 120° C. in the presence or absence of catalysts, although polymerization is quite rapid in the range of 40–100° with catalysts. Polymerization in the absence of catalysts is slow even at 200–250° C.

While the invention has been illustrated with vinyl-phthalimide, any vinylimide of any aromatic, including aromatic heterocyclic, dicarboxylic acid having its carboxyl groups attached to adjacent ring carbon atoms may be employed including the vinylimides of phthalic, 3-nitrophthalic, 4-bromophthalic, tetrachlorophthalic, cinchomeronic, 2,3-naphthalenedicarboxylic, 3,6-dihydroxyphthalic, and quinolinic acids.

While the acid portion of the vinylimide may be varied, variation in the vinyl portion is excluded. Thus, substitution of an ethyl radical for the alpha-hydrogen leads to unpolymerizable compounds. For example, alpha-ethylvinylphthalimide

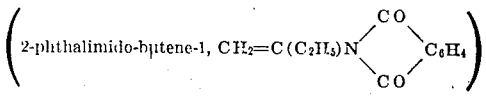

M P. 51–52.5° and containing 7.01% N (the theory being 6.96%), was prepared by pyrolysis at 590–600° and a rate of 4 cc./min. of 2-phthalimidobutyl acetate, B. P. 170–172°/3 mm., M. P. 59–61°, itself prepared from phthalic anhydride and 2-aminobutanol-1. Alphaethylvinylphthalimide, previously purified by two recrystallizations from aqueous ethanol, was recovered unchanged after heating several hours with benzoyl peroxide. A mixture of 2-phthalimidobutene-1 and vinyl acetate, with benzoyl peroxide as catalyst, did not polymerize after long heating. A mixture of methyl methacrylate and 2-phthalimidobutene-1 polymerized rapidly to a soft transparent glass. However, after the product has been purified by three precipitations from toluene solution, it was found by elementary analysis that no nitrogen was present, showing that the 2-phthalimidobutene-1 had not polymerized with the methyl methacrylate. Thus in spite of the similarity of structure of 2-phthalimidobutene-1 and N-vinylphthalimide, no evidence of the polymerization or interpolymerization of the 2-phthalimidobutene-1 could be obtained. To further characterize the 2-phthalimidobutene-1, a portion was hydrolyzed by aqueous acid, and the methly ethyl ketone was identified as the semicarbazone, M. P. 138–140°.

The vinylimide as above defined may be polymerized with one or more other polymerizable materials, preferably one or more other polymerizable negatively substituted vinylidene or vinyl compounds as above defined, including methyl methacrylate, ethyl methacrylate, phenyl methacrylate, cyclohexyl methacrylate, p-cyclohexylphenyl methacrylate, styrene, acrylonitrile, methacrylonitrile, methacrylic acid, methacrylic amide, methacrylic anilide, phenyl vinyl ketone, vinyl acetate, vinyl propionate, vinyl butyrate, vinyl chloroacetate, methyl acrylate, ethyl acrylate, butyl methacrylate, octyl methacrylate, n-dodecyl methacrylate, and methyl vinyl ketone.

While it is a frequent and almost usual occurrence that mixtures of compounds have a melting point lower than either component, interpolymers containing N-vinylphthalimide have, in general, a higher softening point than the polymers of the simple vinyl compounds not containing the N-vinylphthalimide. This property of imparting a higher softening point to vinyl polymers is particularly important in connection with low softening polymers such as those obtained from vinyl acetate, methyl acrylate, or vinyl ether, all of which have low softening temperatures. Accordingly, interpolymers containing N-vinylphthalimide find uses where other vinyl polymers alone would not be suitable, such as for moldings and castings which may be exposed to temperatures somewhat above those at which the simple polymeric vinyl compounds would soften.

Hydrolysis of the polymers with sodium hydroxide in phenol leads to the formation of a polyvinylphthalamic acid, whereas hydrolysis in acid medium leads to a compound containing free amino groups. Hydrolysis of the polymers with ethanolamine gives a product containing both free amino groups and free carboxyl groups. These products are of value in modifying the dyeing characteristics of cellulosic materials, such as regenerated cellulose and cellulose acetate. These products may be used as dispersing agents, sizes, etc.

The term "aromatic dicarboxylic acid" as used in the claims is intended to include within its scope "aromatic heterocyclic dicarboxylic acids."

The above description and examples are intended to be illustrative only. Any modification of or variation therefrom which conforms to the spirit of the invention is intended to be included within the scope of the claims.

We claim:

1. A polymer of an N-vinylimide of an aromatic dicarboxylic acid having its two carboxyl groups on adjacent ring carbons.

2. A polymer according to claim 1 wherein the vinylimide is an N-vinylimide of an isocyclic aromatic dicarboxylic acid.

3. A polymer according to claim 1 wherein the vinylimide is N-vinylphthalimide.

4. An interpolymer of an N-vinylimide of an aromatic dicarboxylic acid having its carboxyl groups on adjacent ring carbons with at least one different polymerizable organic compound of the class consisting of vinyl and vinylidene compounds.

5. Composition of claim 4 wherein the vinylimide is an N-vinylimide of an isocyclic aromatic dicarboxylic acid.

6. Composition of claim 4 wherein the vinylimide is N-vinylphthalimide.

7. An interpolymer of vinyl acetate with an N-vinylimide of an aromatic dicarboxylic acid having its carboxyl groups on adjacent ring carbon atoms.

8. An interpolymer of vinyl acetate with N-vinylphthalimide.

9. An interpolymer of methyl acrylate with an N-vinylimide of an aromatic dicarboxylic acid having its carboxyl groups on adjacent ring carbon atoms.

10. An interpolymer of methyl acrylate with an N-vinylphthalimide.

11. An interpolymer of methyl methacrylate with an N-vinylimide of an aromatic dicarboxylic acid having its carboxyl groups on adjacent ring carbon atoms.

12. An interpolymer of methyl methacrylate with an N-vinylphthalimide.

WILLIAM EDWARD HANFORD.
HALSEY BIDWELL STEVENSON.